F. J. Chapman,
Portable Soda Fountain.

Nº 49,719.   Patented Sep. 5, 1865.

Witnesses:   Inventor:

UNITED STATES PATENT OFFICE.

F. J. CHAPMAN, OF HURON, INDIANA.

IMPROVEMENT IN SODA-FOUNTAINS.

Specification forming part of Letters Patent No. 49,719, dated September 5, 1865.

*To all whom it may concern:*

Be it known that I, F. J. CHAPMAN, of Huron, in the county of Lawrence and State of Indiana, have invented a new and Improved Soda-Fountain; and I do hereby declare that the following is a full, clear, and exact description thereof, which will enable others skilled in the art to make and use the same, reference being had to the accompanying drawings, forming part of this specification, in which—

Figure 1:
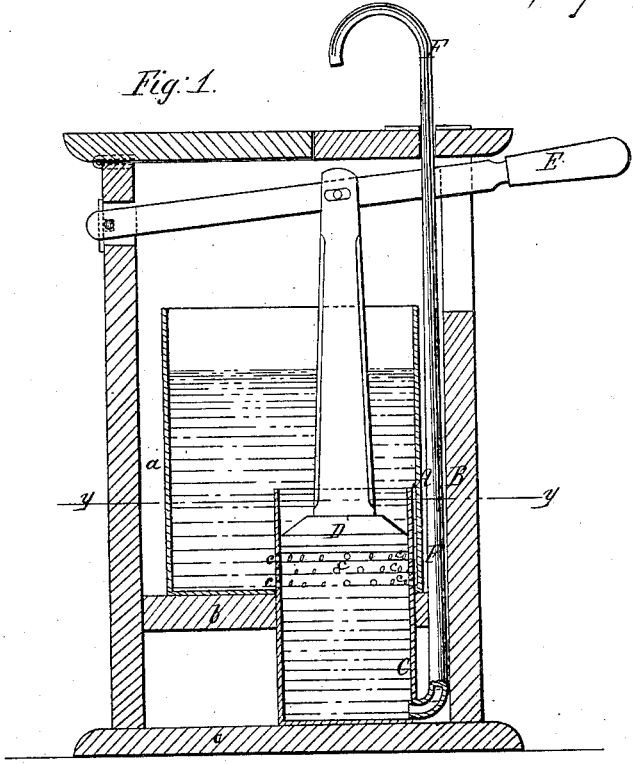
Figure 2:
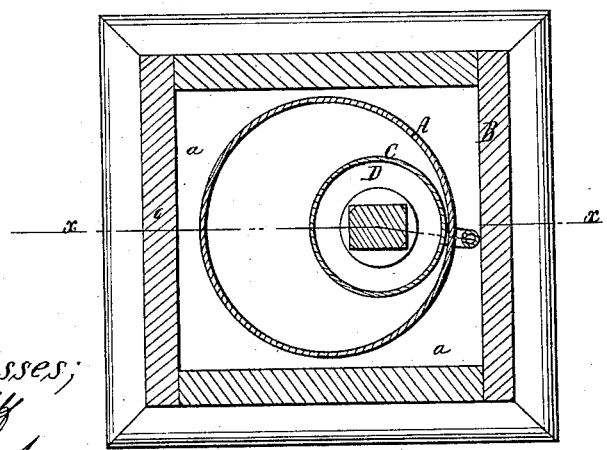

Figure 1 represents a vertical section of this invention, the line $x\ x$, Fig. 2, indicating the plane of section. Fig. 2 is a horizontal section of the same, taken in the plane indicated by the line $y\ y$, Fig. 1.

Similar letters of reference indicate like parts.

This invention consists in a pump-cylinder with perforated sides, and combined with a suitable vessel containing soda-water or other gaseous liquid, and with a discharge-pipe, in such a manner that when the piston which works in the pump-cylinder is raised above the perforations in the sides of said cylinder the soda-water or other liquid descends, and on depressing said piston the liquid contained in the lower part of the cylinder is forced out through the discharge-pipe, and a pump is thus obtained which operates without any valve or other part that would be liable to get out of order. The vessel containing the soda-water or other liquid is inclosed in a box, and the space between the outside of said vessel and the interior of the box is packed with ice, so as to keep the contents of the fountain cool, and when the piston is raised the liquid in the discharge-pipe descends to a level with the liquid in the vessel and it remains cool, whereas in ordinary fountains a quantity of liquid is retained in the upper part of the discharge-pipe, and the first portion of the liquid discharged is always stale and disagreeable to drink.

A represents a vessel made of tinned sheet-iron or other suitable material in any convenient form or shape. This vessel is placed in a box, B, made of wood or other bad conductor of heat, and of such a size as to leave a space, $a$, all around the vessel A, as clearly shown in the drawings. This space is intended to be packed with ice for the purpose of keeping the contents of the vessel A cool. Said vessel is supported by a false bottom, $b$, secured in the box B at a certain distance above the real bottom $c$, as clearly shown in Fig. 1 of the drawings.

From the real bottom $c$ of the box B rises the pump-cylinder C, extending up through the bottom of the vessel A and a certain distance into said vessel, as clearly shown in Fig. 1. That portion of the pump-cylinder situated close above the bottom of the vessel A is perforated with a large number of holes, $c$, and in the interior of said cylinder moves a piston, D, to which motion is imparted by a hand-lever, E, or in any other suitable manner. From the bottom of the pump-cylinder rises a pipe, F, up through the top of the box B, which may form the counter, and this pipe forms the discharge-pipe through which the liquid from the cylinder and vessel is discharged.

The operation is as follows: When the piston D is raised to the position in which it is shown in Fig. 1 of the drawings the liquid from the vessel A passes down through the holes $c$ in the side of said cylinder and fills the same up as the piston will permit. By depressing the piston the liquid contained in the lower part of the cylinder is forced out through the discharge-pipe F. By the hand-lever E the motion of the piston can be regulated with the greatest nicety and the exact quantity required to fill a tumbler or other vessel can be forced out with the greatest ease. By raising the plunger again the liquid contained in the pipe sinks back to a level with the liquid in the vessel, and no portion of the liquid is liable to become stale.

The pump constructed as herein described is made entirely without valves, and all its parts are so constructed that the same are not liable to get out of repair.

If the vessel A has to be hermetically closed, as it will have to be when it is used for soda-water or other gaseous liquid, the pump-cylinder can be applied to its side.

I claim as new and desire to secure by Letters Patent—

The pump-cylinder C, provided with perforated sides and applied in combination with a vessel, A, containing soda-water or other liquid, and with a suitable piston and discharge-pipe, substantially as and for the purpose described.

The above specification of my invention signed by me this 19th day of July, 1865.

F. J. CHAPMAN.

Witnesses:
ANDERSON BEASLEY,
MICHAEL VOORHIS.